(12) United States Patent
Austin (10) Patent No.: US 11,880,735 B1
(45) Date of Patent: Jan. 23, 2024

(54) SYSTEMS AND METHODS FOR DETERMINING RF CABLING CONFIGURATION

(71) Applicant: ZEBRA TECHNOLOGIES CORPORATION, Lincolnshire, IL (US)

(72) Inventor: Timothy B. Austin, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/893,311

(22) Filed: Aug. 23, 2022

(51) Int. Cl.
*G06K 7/10* (2006.01)

(52) U.S. Cl.
CPC ........... *G06K 7/10* (2013.01); *G06K 7/10356* (2013.01); *G06K 7/10128* (2013.01); *G06K 7/10138* (2013.01); *G06K 7/10316* (2013.01)

(58) Field of Classification Search
CPC .......... G08B 13/14; G01N 37/00; G06K 7/00; G06K 7/0008; G06K 7/01; G06K 7/10; G06K 7/10346; G06K 7/10356; G06K 19/00; G06K 19/07; G06K 19/0723; H01Q 1/12; H01Q 1/2216; G05D 1/00; G05D 1/0212; G05D 1/0263
See application file for complete search history.

(56) References Cited

U.S. PATENT DOCUMENTS

| 2007/0188328 A1* | 8/2007 | Mochizuki | G06K 7/10356 702/81 |
| 2007/0194930 A1* | 8/2007 | Hunt | G06K 7/10356 340/572.7 |
| 2008/0129643 A1* | 6/2008 | Itoh | G06K 7/10346 343/878 |
| 2013/0201003 A1* | 8/2013 | Sabesan | G01S 13/878 340/10.1 |

OTHER PUBLICATIONS

NPL Search (Jun. 8, 2023).*

* cited by examiner

*Primary Examiner* — Van T Trieu (57) ABSTRACT

Systems and methods for determining radio frequency (RF) cabling configuration are provided. The systems include a central controller that includes two or more antenna ports that are coupled to corresponding antennas via respective RF cables. In embodiments, the central controller executes a calibration interrogation cycle to detect a misconfiguration of an RF cable that couples an antenna port of the central controller to an antenna port of a detector station that includes an antenna under test. While the central controller executes the calibration interrogation cycle, a RF sensor is disposed in a signal range of the antenna under test. The systems detect indications provided by the RF sensor to identify a misconfiguration of the RF cabling and provide guidance on how to re-configure the RF cabling.

27 Claims, 7 Drawing Sheets

95e Eight Antennas

| | Port |
|---|---|
| 1 | 2 |
| 2 | 1 |
| 3 | 2 |
| 4 | 4 |
| 5 | 3 |
| 6 | 4 |
| 7 | 3 |
| 8 | 4 |
| 9 | 3 |
| 10 | 4 |
| 11 | 6 |
| 12 | 5 |
| 13 | 6 |
| 14 | 5 |
| 15 | 6 |
| 16 | 5 |
| 17 | 6 |
| 18 | 5 |
| 19 | 6 |
| 20 | 5 |
| 21 | 6 |
| 22 | 8 |
| 23 | 7 |
| 24 | 8 |
| 25 | 7 |
| 26 | 8 |
| 27 | 7 |
| 28 | 8 |
| 29 | 7 |
| 30 | 8 |
| 31 | 7 |
| 32 | 8 |
| 33 | 7 |
| 34 | 8 |
| 35 | 7 |
| 36 | 8 |

95d Four Antennas

| | Port |
|---|---|
| 1 | 2 |
| 2 | 1 |
| 3 | 2 |
| 4 | 4 |
| 5 | 3 |
| 6 | 4 |
| 7 | 3 |
| 8 | 4 |
| 9 | 3 |
| 10 | 4 |

95c Three Antennas

| | Port |
|---|---|
| 1 | 1 |
| 2 | 3 |
| 3 | 2 |
| 4 | 3 |
| 5 | 2 |
| 6 | 3 |
| 7 | No Power |

95b Two Antennas

| | Port |
|---|---|
| 1 | 2 |
| 2 | 1 |
| 3 | 2 |
| 4 | No Power |

95a Single Antenna

| | Port |
|---|---|
| 1 | 1 |
| 2 | No Power |

SYSTEMS AND METHODS FOR DETERMINING RF CABLING CONFIGURATION

BACKGROUND

Venues are often equipped with Radio frequency (RF) identification (RFID) systems to track RFID tags located throughout the venue. For example, RFID tags may be affixed to objects that are moving through a warehouse or products offered for sale at a store. As venues are often larger than a signal range of a given RFID detector station, the RFID system includes multiple RFID detector stations positioned throughout the venue. The RFID detector stations are coupled with a central controller configured to control operation of the RFID detector stations and/or analyze the RFID data collected thereat.

Generally, the RF cabling connecting the RFID detector stations and the central controller is not visible to persons traversing the venue. The RF cabling is often routed through venue walls, ceilings, and/or other structural elements such that the RF cabling is largely out of sight. Thus, when a venue operator first deploys a RFID system, the RF cabling is run through these structural elements to connect the RF cabling and the central controller.

However, these structural elements also hide the RF cabling from those deploying the RFID system. Thus, as the RF cabling is run through the structural elements, the RF cabling may become twisted making it difficult to identify the correspondence between an antenna of an RFID detector station and an antenna port of the central controller. If the RF cabling is incorrectly configured, when the central controller detects a read event for an RFID tag the central controller may associate the read event with the wrong antenna. As a result, the central controller will derive the wrong location of the RFID tag.

Accordingly, to prevent location errors caused by the misconfiguration of RF cabling, there is a need for systems and methods for determining RF cabling configuration.

SUMMARY

In an embodiment, the present invention is a system for calibrating a radio frequency identification (RFID) detector. The system includes (i) two or more antenna ports configured to be communicatively coupled to two or more antennas via respective RF cables; and (ii) a controller operatively connected to the two or more antenna ports. The controller is configured to implement a calibration interrogation cycle by (1) assigning each of the two or more antenna ports a unique sequence of on signals and off signals, (2) dividing the calibration interrogation cycle into a plurality of sequential slots, (3) configuring the plurality of sequential slots such that, during each cycle of the calibration interrogation cycle, a sequence of antenna ports assigned to the plurality of slots embeds the unique sequence of on signals and off signals assigned to the two or more antenna ports, and (4) sequentially transmitting a plurality of interrogation signals via the two or more antenna ports in accordance with the antenna ports assigned to the plurality of sequential slots to determine whether a sequence of indications provided by an RF sensor corresponds to the unique sequence of on signals and off signals for the two or more antenna ports.

In another embodiment, the present invention is a method of calibrating a radio frequency identification (RFID) detector. The method includes (1) configuring the controller of claim 1 to implement a calibration interrogation cycle; (2) disposing an RF sensor in a signal range of an antenna under test communicatively coupled to the controller via RF cabling via an antenna port intended to be a first antenna port assigned to the antenna under test; (3) determining that a sequence of indications provided by the RF sensor does not match an expected sequence of indications for the first antenna port; and (4) based on the sequence of indications provided by the RF sensor, re-configuring the RF cabling.

In yet another embodiment, the present invention is a computer-implemented method for calibrating a radio frequency identification (RFID) detector that includes (i) two or more antenna ports configured to be communicatively coupled to two or more antennas via respective RF cables, and (ii) a controller operatively connected to the two or more antenna ports. The method includes (1) assigning, via the controller, each of the two or more antenna ports a unique sequence of on signals and off signals; (2) dividing, via the controller, an interrogation signal into a plurality of sequential slots; (3) configuring, via the controller, the plurality of sequential slots such that, during each cycle of the calibration interrogation cycle, a sequence of antenna ports assigned to the plurality of slots embeds the unique sequence of on signals and off signals assigned to the two or more antenna ports; and (4) sequentially transmitting, via the controller, a plurality of interrogation signals via the two or more antenna ports in accordance with the antenna ports assigned to the plurality of sequential slots to determine whether a sequence of indications provided by an RF sensor corresponds to the unique sequence of on signals and off signals for the antenna port.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
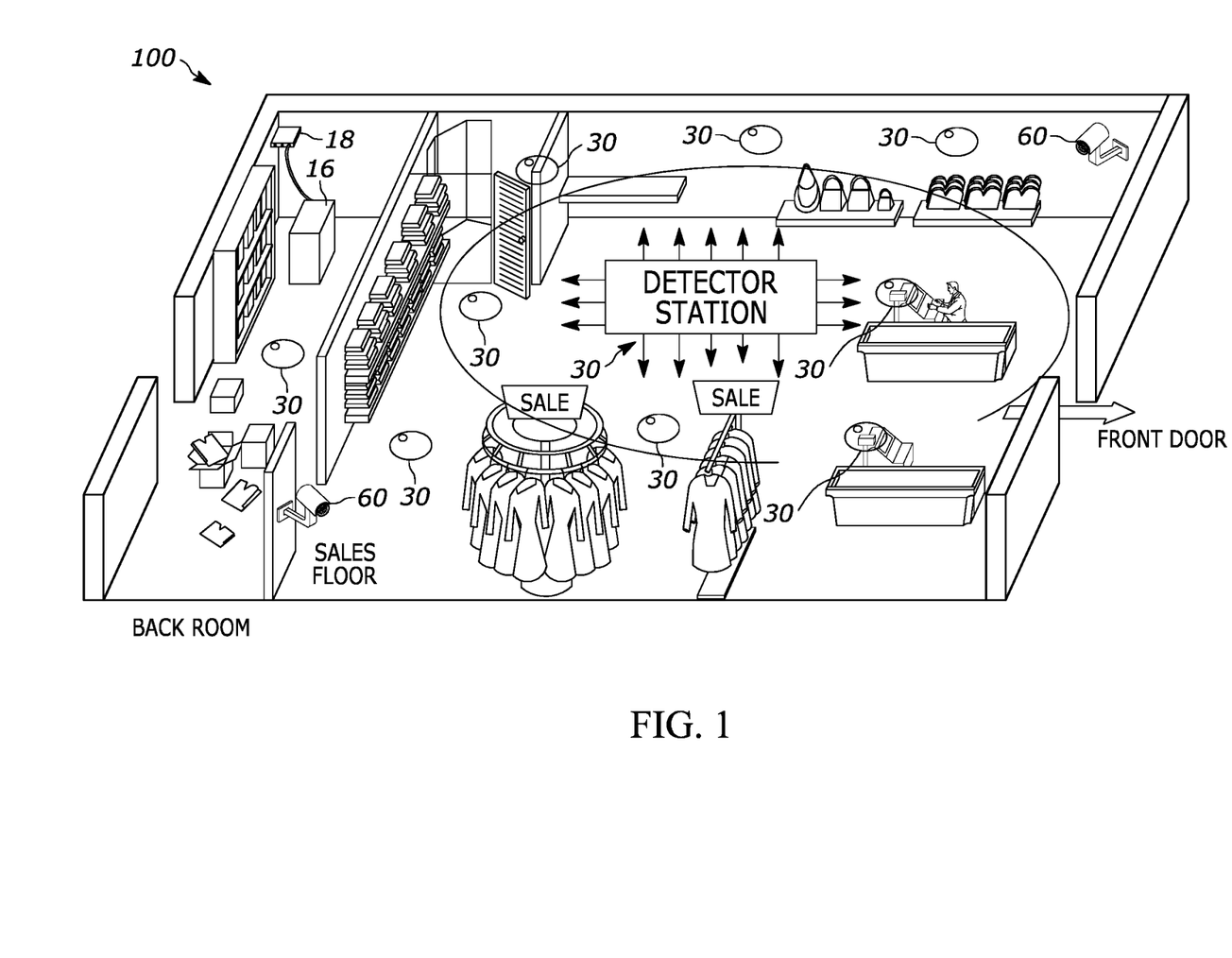
FIG. 1 illustrates a perspective of an example venue that includes an RFID system, as disclosed herein.

FIG. 1 is a perspective view, as seen from above, of a venue 100 illustrating an arrangement for which a Radio Frequency Identification (RFID) system within the venue 100 is deployed to facilitate tracking objects within the venue 100. Although the example venue 100 is a retail venue, other types of venues (such as a warehouse, a transport center, an airport, a stadium, a museum, and so on) are envisioned. In the example embodiment of FIG. 1, the venue 100 includes a backroom that has a central controller 16. In other embodiments, the central controller 16 may be located elsewhere on or proximate to the venue 100. The central controller 16 may be operated by venue personnel and/or personnel associated with the RFID system.

The central controller 16 may comprise a networked host computer or server. The central controller 16 may be connected to a plurality of detector stations 30 positioned throughout the venue 100 via the network switch 18. As further described herein, the detector stations 30 include RFID readers that can detect RFID tags (not depicted) that are affixed to objects (such as products or other goods) that move through the venue 100. The detector stations 30 may include other sensors in addition to the RFID readers, for example, image sensors, ultrasonic sensors, etc. In some embodiments, in addition to any image sensors included in the detector stations 30, the example venue 100 may include one or more dedicated image sensors 60 configured to capture image data representative of various locations of the venue 100, including areas proximate to the detector stations 30. In some embodiments, the venue 100 includes multiple central controllers 16 and/or switches 18 connected to respective subsets of the detector stations 30 associated with the venue 100.

Each of the detector stations 30 and the image sensors 60 maybe in wired or wireless electronic communication with the central controller 16 via the network switch 18 to support data communications therebetween. For example, in some embodiments, the detector stations 30 and the image sensors 60 may be connected via Category 5 or 6 cables and use the Ethernet standard for wired communications. In other embodiments, the detector stations 30 and the image sensors 60 may be connected wirelessly, using a built-in wireless transceiver, and may use the IEEE 802.11 (WiFi) and/or Bluetooth standards for wireless communications. Other embodiments may include detector stations 30 and image sensors 60 that use a combination of wired and wireless communication.

In addition to the data coupling, the detector stations 30 and the central controller 16 may also establish a wired radio frequency (RF) coupling therebetween. For example, the central controller 16 and the detector stations 30 may be connected via a coax or other type of RF cable. In these embodiments, the central controller 16 may generate an RF signal (either at a carrier frequency or at baseband) and route the RF signal over the RF cable for transmission by an antenna of the detector station 30.

Figure 2:
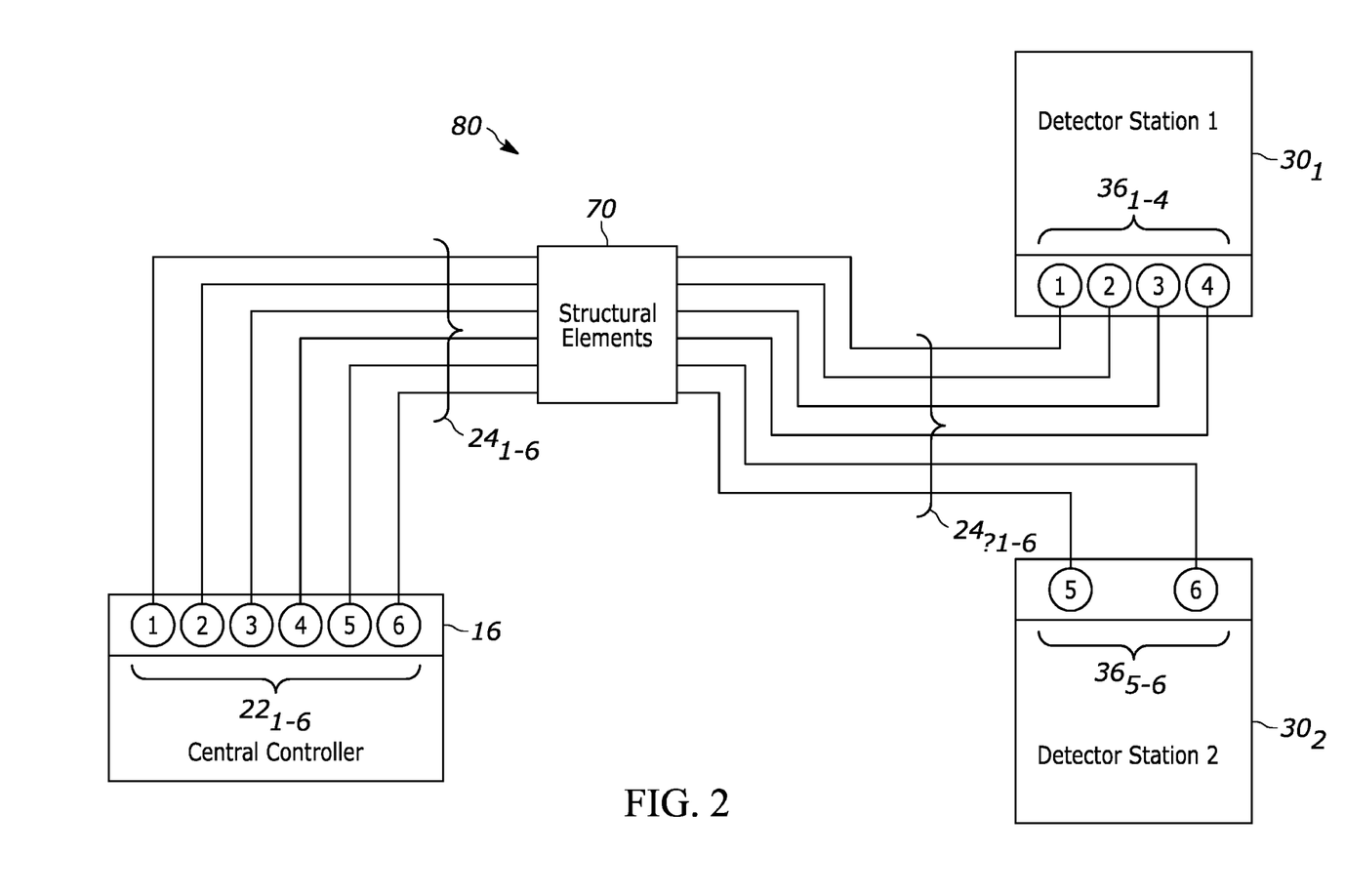
FIG. 2 illustrates a schematic representation of an RFID system during configuration.

With simultaneous reference to FIG. 2, illustrated is a schematic representation 80 of an RFID system, such as the RFID system implemented at the venue 100. The schematic representation 80 illustrates the RF cabling 24 coupling the central controller 16 to the detector stations $30_1$, $30_2$. While FIG. 2 illustrates an embodiment where the RF cabling 24 is coupled directly to the central controller 16, in other embodiments, the RF cabling 24 may instead be coupled to the switch 18. Accordingly, disclosure herein related to the antenna ports 22 of the central controller 16 envisions an alternate implementation via one or more antenna ports of the switch 18.

As described above, the RF cabling 24 is ran through structural elements 70 of the venue 100 such that the RF cabling 24 is not visible to a customer of the venue 100. For example, the structural elements may include a wall, a ceiling, a column, and/or any other element through which the RF cabling 24 can be run. In the illustrated embodiment, the central controller 16 includes six antenna ports 22 that are to be coupled to a respective antenna port 36 of the detector stations $30_1$, $30_2$. That is, the antenna port $22_1$ of the central controller 16 is to be coupled to the antenna port $36_1$ of the detector station $30_1$, the antenna port $22_2$ of the central controller 16 is to be coupled to the antenna port $36_2$ of the detector station $30_1$, and so on. However, when the RF cable $24_1$ is run through the structural elements 70, there is uncertainty as to which RF cable 24 is actually the RF cable $24_1$. As such, the RF cable 24 coupled to the antenna port $36_1$ is labeled as $24_{?1}$.

Accordingly, techniques disclosed herein relate to performing a calibration of the detector stations 30 to verify that the RF cable $24_1$ and RF cable $24_{?1}$ are, in fact, the same RF cable 24. If the calibration results in a determination that the RF cable $24_1$ and RF cable $24_{?1}$ are two different RF cables, techniques disclosed herein relate to re-configuring the RF cabling 24 to ensure that the RF system functions as intended.

Figure 3:
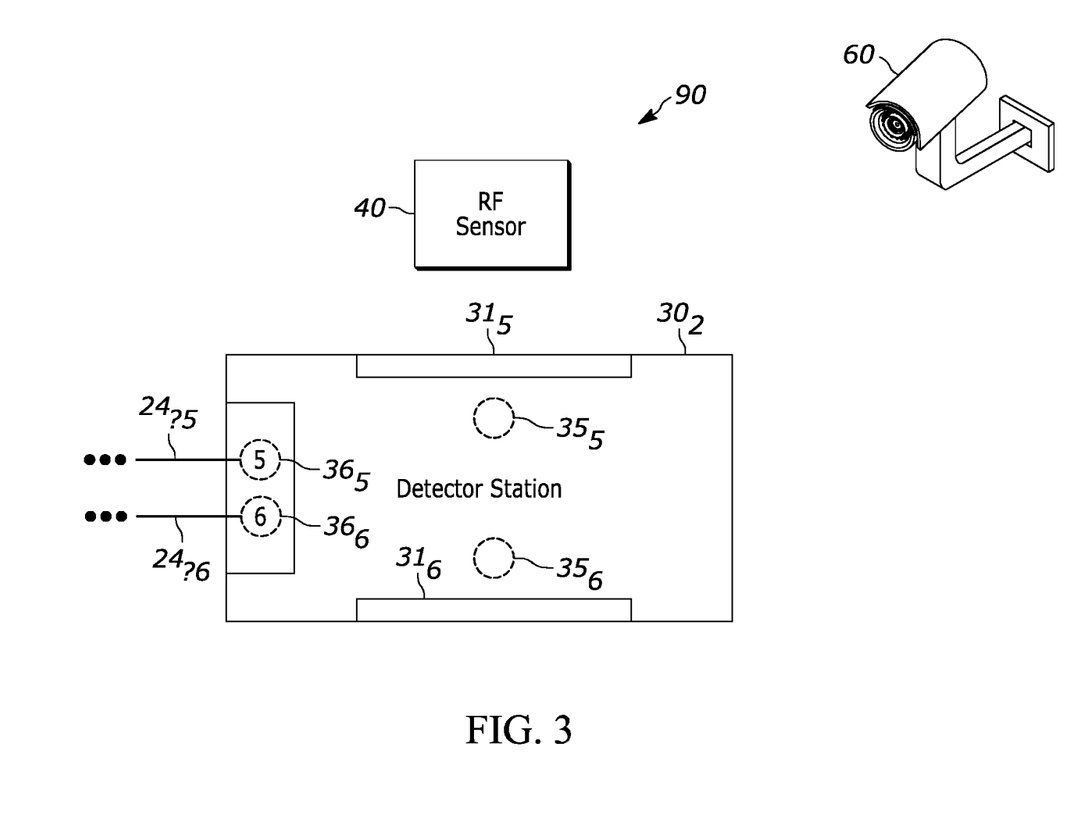
FIG. 3 illustrates an example environment for verifying RF cabling for an antenna under test of an RFID system.

With simultaneous reference to FIG. 3, illustrated is an example environment 90 for verifying the RF cabling 24 coupled to an antenna under test of an RFID system (e.g., the RFID system of FIGS. 1-2) as part of a calibration process. In the environment 90, the detector station $30_2$ includes two antenna ports $36_5$, $36_6$ that are intended to be coupled to antenna ports $22_5$, $22_6$, respectively of the central controller 16 via RF cables $24_5$, $24_6$, respectively. In the illustrated embodiment, the detector station $30_2$ is configured to transmit RF signals received at the antenna ports $36_5$, $36_6$ via the antennas $31_5$, $31_6$, respectively. Similarly, the detector station $30_2$ is configured to route RF signals sensed by the antennas $31_5$, $31_6$, over the antenna ports $36_5$, $36_6$, respectively. Accordingly, the calibration process for the detector station $30_2$ includes determining whether the RF cable $24_{?5}$ is the RF cable $24_5$ and whether the RF cable $24_{?6}$ is the RF cable $24_6$ such that RF signals sensed by the antennas $31_5$ and $31_6$ are routed over the correct RF cable 24. To this end, because the signal range of the antennas $31s$, $31_6$ extend outwards from the detector station $30_2$, mistakenly coupling the RF cable $24s$ to antenna port $36_6$ and RF cable $24_6$ to antenna port $36_5$ may result in the central controller 16 determining that RFID tags are located on the opposite side of the detector station $30_2$ than in reality. Because many two-antenna detector stations are configured to operate as an ingress/egress sensor, this may further result in an incorrect accounting of RFID tags that are located in the venue 100.

To test the configuration of the RF cable $24_{?5}$, an RF sensor 40 is disposed within signal range of the antenna $31_5$ and is configured to transmit the RF signals received via the antenna port $36_5$. In some embodiments, the RF sensor 40 includes a "light-up" RFID tag coupled to an arm or type of body that is manipulable by a deployment engineer. To test an antenna, the deployment engineer may dispose (e.g., hold up) the RF sensor 40 within signal range of the antenna under test. A light-up RFID tag is a passive or semi-passive RFID tag that diverts a portion of the received RF energy to a light emitting diode (LED) coupled to the RFID tag. As a result, when a light-up RFID tag is in the presence of an RF signal, the energy provided by the RF signal energizes the LED such that light is visible to the deployment engineer and/or the image sensor 60. Accordingly, techniques disclosed herein relate to configuring the central controller 16 to transmit a series of RF signals over the RF cables 24 such that a series of indications provided by the RF sensor 40 (e.g., an illumination pattern) identify which RF cable 24 corresponds to the RF cable $24_{?5}$.

More particularly, techniques disclosed herein relate to configuring the central controller 16 to operate in a calibration mode during which the central controller 16 routes RF signals over the RF ports 22 in particular manner such that the indications provided by the RF sensor 40 indicate the antenna port 22 to which an antenna under test is coupled. In the illustrated scenario, the antenna under test is antenna $31_5$ corresponding to antenna port $36_5$ which is coupled to RF cable $24_{?5}$. While FIG. 3 only depicts a scenario where antenna $31_5$ is the antenna under test, similar techniques may be performed to validate that the other RF cables 24 are coupled to the other antennas (and/or antenna ports corresponding thereto) of the RF system in the intended manner.

While operating in the calibration mode, the central controller 16 may assign the antenna ports 22 a unique identifier (such as a port number). In the port number example, the antenna port $22_1$ is assigned the number 1 as an identifier, the antenna port $22_2$ is assigned the number 2 as an identifier, and soon. In other examples, a different unique correspondence between antenna port number and identifier may be used.

The central controller 16 may also divide an interrogation cycle for the calibration mode (the "calibration interrogation cycle") into a plurality of sequential slots. The central controller 16 then assigns individual antenna ports 22 to the sequential slots. More particularly, the central controller 16 assigns the individual ports 22 to the sequential slots such that the sequence of antenna port assignments embeds the assigned identifiers.

When executing the calibration interrogation cycle, the central controller 16 may identify a port number assigned to a current slot and route an interrogation signal over the assigned antenna port. If the RF sensor 40 is disposed in the signal range of the antenna coupled to the assigned antenna port, the RF sensor 40 may energize an LED (or provide another type of indication). In this sense, the assignment of the antenna port to a particular sequential slot may be viewed as an "on signal" for the assigned antenna port. Alternatively, if the RF sensor 40 is disposed in the signal range of the antenna not coupled to the assigned antenna port, the RF sensor 40 may not provide an indication. In this sense, the non-assignment of the antenna port to a particular sequential slot may be viewed as an "off signal" for the assigned antenna port. After routing the interrogation signal over the antenna port assigned to the last sequential slot, the central controller 16 may return to the start of the calibration interrogation cycle and route an interrogation signal over the antenna port assigned to the first sequential slot.

With particular reference to the example environment 90, when the central controller 16 routes an interrogation signal over the RF cable $24_{?5}$, the RF sensor 40 provides a signal that indicates the interrogation signal was transmitted by the antenna $31_5$. Accordingly, if the RF cable $24_{?5}$ is indeed the RF cable $24_5$, the RF sensor 40 provides a series of indications that embeds the assigned identifier for antenna port $22_5$ (e.g., the number 5). That is, the RF sensor 40 may energize the LED in a manner that produces an illumination pattern having five pulses of light before exhibiting an off period. Alternatively, if the RF cable $24_{?5}$ is in fact a different RF cable 24, the RF sensor 40 provides an illumination pattern that embeds the assigned identifier of the antenna port 22 to which the antenna port $36_5$ is actually coupled.

Figure 4:
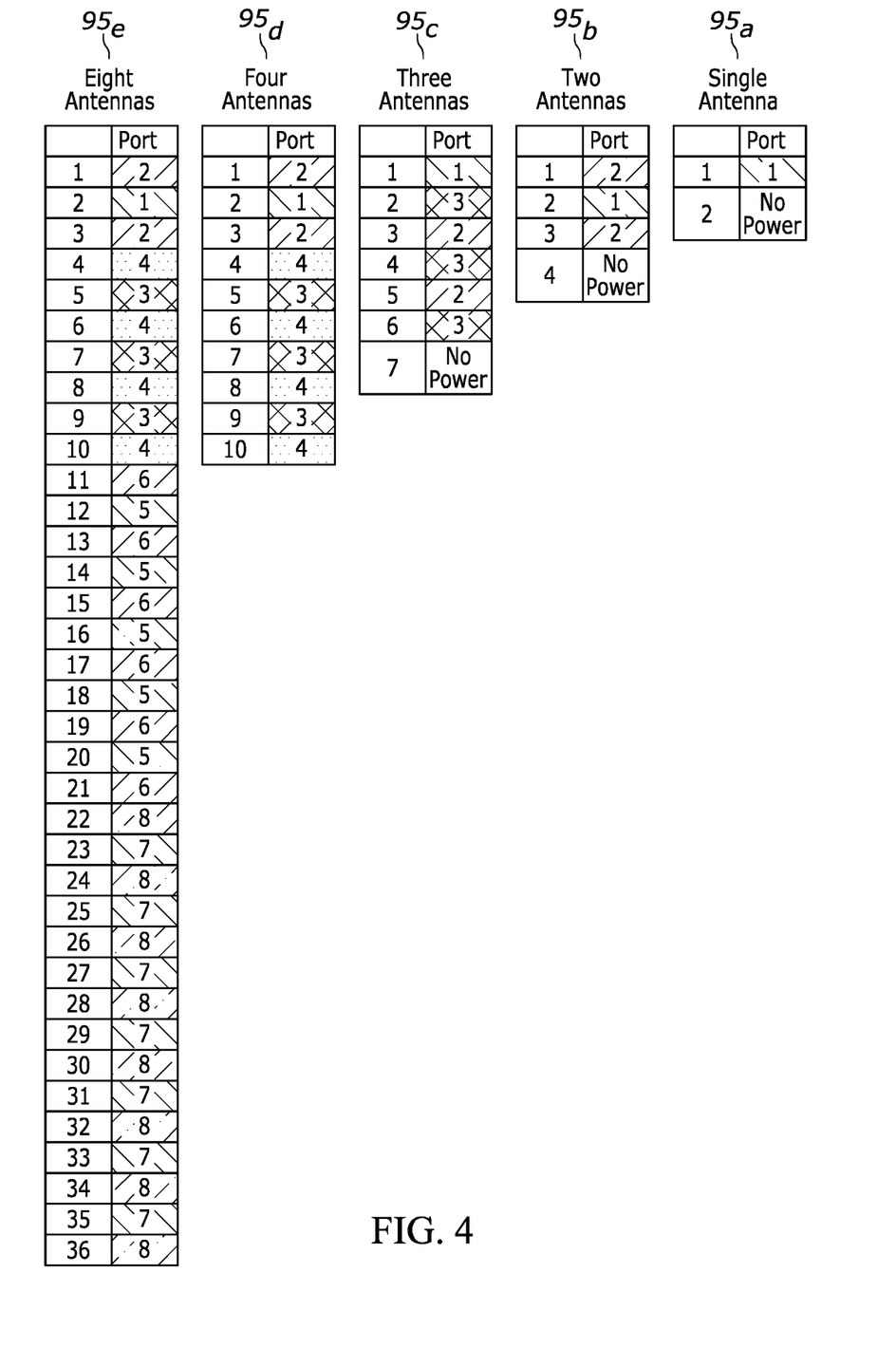
FIG. 4 illustrates example calibration interrogation cycles and their corresponding assignments of antenna ports to sequential slots.

With simultaneous reference to FIG. 4, illustrated are example calibration interrogation cycles 95 and their corresponding assignments of antenna ports to sequential slots. In particular, FIG. 4 illustrates an interrogation cycle 95*a* for a single antenna arrangement, an interrogation cycle 95*b* for a two antenna arrangement, an interrogation cycle 95*c* for a three antenna arrangement, an interrogation cycle 95*d* for a four antenna arrangement, and an interrogation cycle 95*e* for an eight antenna arrangement.

For each of the interrogation cycles 95, the antenna ports are assigned an identifier (e.g., a port number). That is, in each applicable interrogation cycle 95, antenna port 1 is assigned one slot, the antenna port 2 is assigned 2 slots, the antenna port 3 is assigned 3 slots, and so on. Moreover, the interrogation cycles 95 arrange the assignment of slots such that if a RF sensor 40 is disposed in front of an antenna coupled to the assigned antenna port, the RF sensor 40 may produce a series of pulses indicative of the identifier assigned to the antenna port. For instance, the interrogation cycle 95*e* interleaves five slots assigned to antenna port 5 inbetween the six slots assigned to antenna port 6. As a result, when a RF sensor 40 is disposed in front of an antenna coupled to antenna port 5, the RF sensor 40 may produce 5 pulses over the course of the interrogation cycle 95*e*. Similarly, when a RF sensor 40 is disposed in front of an antenna coupled to antenna port 6, the RF sensor 40 may produce 6 pulses over the course of the interrogation cycle 95*e*.

As illustrated, the interrogation cycles 95*a-c* include a null or "no power" assignment for the last slot. This provides for distinguishing the sequence of indications provided by the RF sensor 40 to the central controller 16 across multiple calibration interrogation cycles. For example, for the interrogation cycle 95*b*, without the null assignment to slot 4, the indication provided by the RF sensor 40 when disposed in the signal range of the antenna coupled to antenna port 2 during slot 3 may extend into the indication provided during slot 1 of the subsequent execution of the interrogation cycle 95*b*. That is, rather than providing two pulses to indicate the antenna port 2, the RF sensor may instead provide a single long pulse. This long pulse may be difficult to distinguish from the short pulse provided by the RF sensor 40 when disposed in the signal range of the antenna coupled to antenna port 1. Similarly, for the interrogation cycle 95*c*, without the null assignment to slot 7, the indication provided by the RF sensor 40 when disposed in the signal range of the antenna coupled to antenna port 3 can be a constant pulsing pattern.

Returning to FIG. 3, illustrated are various means to detect the indication provided by the RF sensor 40 to verify the RF cabling 24 coupled to the antenna under test (e.g., antenna $31_5$). In some embodiments, the central controller 16 is configured to analyze image data provided by the image sensor 60 to detect the indications provided by the RF sensor 40. For example, the central controller 16 may correlate the image sensors 60 with different areas (e.g., zones) of the venue 100. That is, for each image sensor 60, the central controller 16 may store an indication of any detector stations 30 within a field of view of the image sensor 60. Accordingly, when the central controller 16 detects, for example, pulses of light emitted by the RF sensor 40 in image data captured by the image sensor 60, the central controller 16 may determine a relative position of the pulse of light to the detector stations 30. Based on the relative position, the central controller 16 may identify the particular antenna 31 (which, in FIG. 3, is antenna $31_5$) near which the RF sensor 40 is disposed. The central controller 16 may then compare the illumination pattern provided by the RF sensor 40 to the identifier assigned to antenna $31s$ to validate that the correct RF cable 24 is coupled to the antenna port $36_5$.

In some embodiments, the detector station $30_2$ includes photodetectors $35_5$, $35_6$ that respectively correspond to the antennas $31_5$, $31_6$. In these embodiments, the photodetectors $35_5$, $35_6$ are arranged to detect the presence of light emitted by LEDs (such as the LED included in a light-up RFID tag) within the signal range of the antennas $31_5$, $31_6$, respectively. Accordingly, in the example environment 90, when the RF sensor 40 is illuminated in response to the transmission of an interrogation signal by the antenna $31_5$, the light is sensed by the photodetector $35_5$. As a result, a light intensity signal produced by the photodetector $35_5$ encodes the same identifier encoded by the illumination pattern provided by the RF sensor 40.

In an alternate embodiment, the detector station $30_2$ includes an RF sensor built therein. For example, the detector station $30_2$ may include splitters (not depicted) in the transmit paths between the antenna port $36_5$ and the antenna $31_5$ and the antenna port $36_6$ and the antenna $31_6$. One output of the splitters may be routed to respective gates of a transistor or other types of switching elements to produce a voltage signal that indicates when an interrogation signal is being transmitted by the antenna $31_5$, $31_6$. As a result, the voltage signal produced by the detector station $30_2$ encodes the same identifier that would have been encoded in the illumination pattern provided by the external RF sensor 40.

In the photodetector and the splitter embodiments, when the detector station $30_2$ detects a signal indicative of an antenna port identifier, the detector station $30_2$ may decode the identifier and transmit an indication of the identifier to the central controller 16 via a data coupling therebetween. The indication may further include an identifier associated with the transmit path (e.g., an identifier of the antenna $31_5$, antenna port $36_5$, photodetector $35_5$, and/or voltage signal). Accordingly, the central controller 16 may compare the received identifier to an identifier associated with the transmit path to determine whether the RF cable $24_{25}$ is the intended RF cable 24 to be received at the antenna port $36_5$. Additionally or alternatively, the deployment engineer may also visually identify the identifier encoded by the light pulses produced by the RF sensor 40 and compare the encoded identifier to an expected identifier for the antenna under test.

Figure 5:
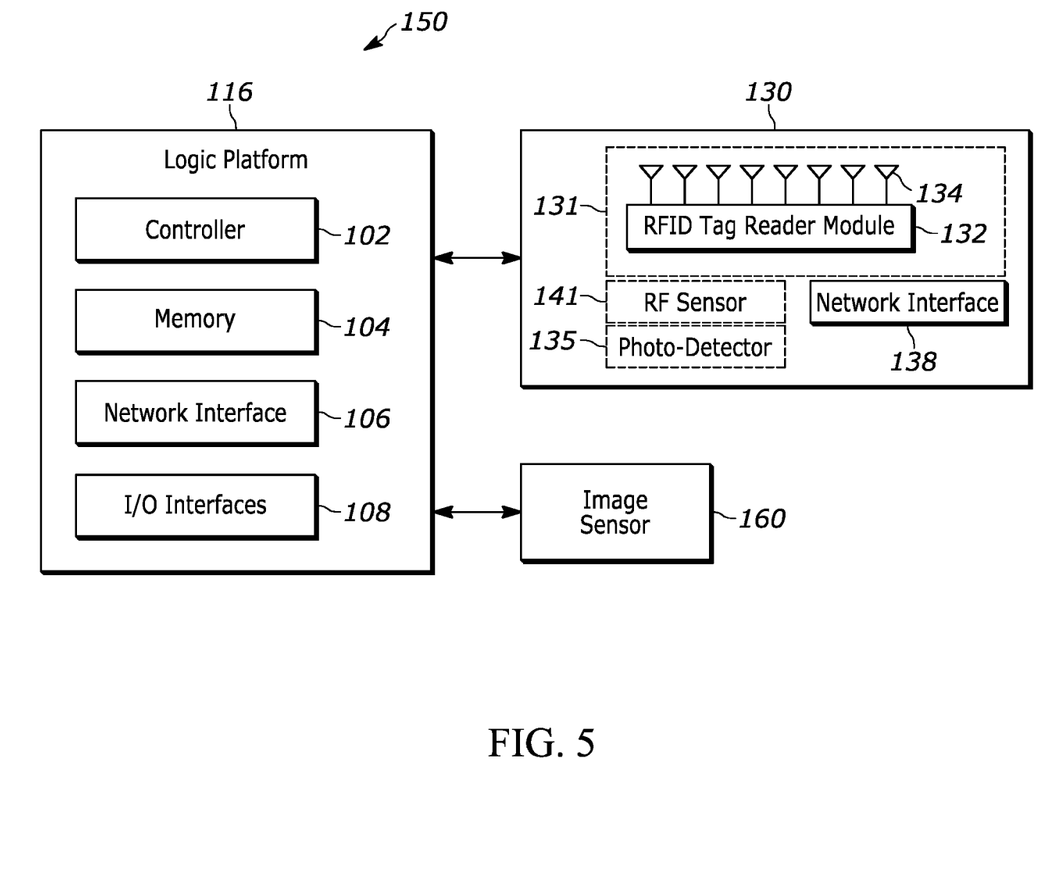
FIG. 5 is a block diagram representative of a RFID system and the various components thereof.

Turning now to FIG. 5, illustrated is a block diagram representative of the RFID system 150 and the various components thereof capable of implementing the techniques described herein. The RFID system 150 may be implemented at the venue 100. The RFID system 150 includes a logic platform 116 (such as the central controller 16) that functions as a processing platform capable of executing instructions to, for example, implement operations of the example methods described herein (including those described with respect to the central controller 16), as may be represented by the flowcharts of the drawings that accompany this description. Example processing platforms include, for example, implementing operations of the example methods described herein via field programmable gate arrays (FPGAs) and application specific integrated circuits (ASICs).

The logic platform 116 includes a controller 102 that includes a processor such as, for example, one or more microprocessors, controllers, and/or any suitable type of processor. The logic platform 116 includes memory (e.g., volatile memory, non-volatile memory) 104 accessible by the processor 102 (e.g., via a memory controller). The example controller 102 interacts with the memory 104 to obtain, for example, machine-readable instructions stored in the memory 104 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the logic platform 116 to provide access to the machine-readable instructions stored thereon. In some embodiments, the memory 104 includes a portion for storing an indication of a port number of the logic platform 116 coupled to an antenna under test.

The logic platform 116 also includes a network interface 106 to enable communication with other machines (e.g., the detector station 130 and/or image sensor 160) via, for example, one or more networks. The example network interface 106 includes any suitable type of communication interface(s) (e.g., wired and/or wireless interfaces) configured to operate in accordance with any suitable protocol(s). For example, the network interface 106 may include a plurality of antenna ports (e.g., the antenna ports 22) via which RF cabling (e.g., the RF cables 24) couples the logic platform 116 to respective antenna ports of the detector stations 130. Accordingly, the example memory 104 may include a portion thereof dedicated to storing configuration for the RFID system 150, such as a port mapping that associates a particular antenna port of the logic platform 116 with a particular antenna port (and/or corresponding antenna) of the detector station 130. The indication of the antenna port of the detector station 130 in the port mappings may include identifiers associated with elements of the detector station that correspond to the antenna port (e.g., an antenna identifier, a photodetector identifier, a RF sensor identifier, etc.). In these embodiments, when the controller 102 is configured to transmit an RF signal via a particular antenna of the detector station 130, the controller 102 may query the port mapping to identify which antenna port the RF signal is to be routed over.

In some embodiments, in response to detecting a mismatch between the port indicated by the port mapping in the memory 104 and the port of the logic platform 116 identified while calibrating the antenna under test, the controller 102 may update the port mapping in the memory 104 to indicate the correct correspondence. For example, if, in the example illustrated by FIGS. 2 and 3, the controller 102 determined that the RF sensor 40 provided an illumination pattern corresponding to the RF cable $24_6$, and not the RF cable $24_5$, the controller 102 may update the port mapping to associate the antenna port $22_6$ with the antenna port $36_5$. It should be appreciated that the controller 102 may also update the port mapping for the port of the logic platform 116 that was previously associated with the antenna under test to either a default or unassigned state, or to the antenna that was previously associated with the antenna under test.

In some embodiments, the network interface 106 also includes a reprogrammable logic circuit between the controller 102 and the antenna ports. For example, the reprogrammable logic circuit may be implemented as a series of multiplexers and/or switches, as a programmable logic controller (PLC), a field programmable gate array (FPGA), and/or other types of reprogrammable logic. In these embodiments, in response to detecting a mismatch between the port indicated by the port mapping in the memory 104 and the port of the logic platform 116 identified while calibrating the antenna under test, the controller 102 may reconfigure the reprogrammable logic circuit such that when the controller 102 is configured to transmit a RF signal to the antenna under test, the RF signal is routed over the port identified while calibrating the antenna under test instead of the port associated with the prior configuration of the reprogrammable logic circuit.

The logic platform 116 also includes I/O interfaces 108 to enable receipt of user input and communication of output data to the user. For example, the I/O interface 108 may include LEDs, a display and/or a speaker configured to output a port number of the logic platform 116 coupled to an antenna under test. More particularly, the I/O interface 108 may be configured to output an indication of a port number derived from data received by the detector station 130 and/or image sensors 160. As a result, a deployment engineer is provided with a visual and/or audio indication as to which antenna port of the network interface 106 the antenna under test is coupled.

Accordingly, a deployment engineer may utilize the indicated port number to manually re-configure the RF cabling. To this end, the RF cabling may be re-configured at the network interface 106 of the logic platform 116 or at the antenna ports of the detector stations 130, depending upon the location of the deployment engineers and/or the type of mismatch. In a first example in the environment 90 where the antenna $31_5$ is the antenna under test, the RF sensor 40 indicates that the RF cable $24_6$ is coupled to the antenna port $36_5$. In this example, because the identified RF cable 24 is intended to be coupled to the detector station $30_2$ (albeit via a different antenna port), the deployment engineer may uncouple RF cables $24_{25}$ (now known to be RF cable $24_6$) and $24_{26}$ from antenna ports $36_5$ and $36_6$ and re-couple RF cable $24_{25}$ to antenna port $36_6$. In a second example in the environment 90 where the antenna $31_5$ is the antenna under test, the RF sensor 40 indicates that the RF cable $24_2$ is coupled to the antenna port $36_5$. In this example, because the identified RF cable 24 is intended to be coupled to the detector station $30_1$, not the detector station $30_2$, the deployment engineer may uncouple RF cables $24_2$ and $24_5$ from the network interface 106 and re-couple the RF cable $24_2$ to antenna port $22_5$.

In some embodiments, the controller 102 may generate a work order that indicates the actions required to configure the RF cabling in the intended manner. In these embodiments, the logic platform 116 may also include a data coupling with a workstation (not depicted) via the network interface 106. Accordingly, the controller 102 may transmit the generated work order to the workstation for fulfillment. In some embodiments, the controller 102 may wait until the calibration process has been completed for each antenna of the RF system before generating a single work order that includes all of the required changes to the configuration of the RF cabling to result in the intended configuration.

The RFID system 150 also includes one or more detector stations 130 (e.g., detector stations 30). More particularly, as shown in FIG. 5, each detector station 130 includes an RFID reader 131 that includes an RFID tag reader module 132 that has a controller, a memory, and an RF transceiver, which are operatively connected to a plurality of RFID antennas 134, which are energized by the RFID tag reader module 132 to radiate RF energy. In the illustrated embodiment, the detector station 130 includes eight RFID antennas 134 disposed in a fixed orientation about a circumference of the detector station 130. The RFID tag reader module 132 may be configured to transmit RF beam or wave energy to the RFID tags via the RFID antennas 134, and to receive RF response signals from the RFID tags at the RFID antennas 134, thereby interrogating and processing the payloads of the RFID tags that are in a signal range thereof. While FIG. 5 illustrates the RFID antennas 134 as individual antennas, the RFID antennas 134 may be an array of antenna elements configured to operate in conjunction with one another at the direction of the RFID tag reader module 132.

The detector stations 130 also include a network interface 138. The example network interface 138 includes any suitable type of communication interface(s) (e.g., wired and/or wireless interfaces) configured to operate in accordance with any suitable protocol(s). For example, the network interface 138 may include antenna ports (e.g., the antenna ports 36) that respectively correspond to the RFID antennas 134. That is, if there are eight RFID antennas 134, the network interface 138 may include eight antenna ports, each one connected to a respective RFID antenna 134 via internal RF circuitry. As described herein, the antenna ports of the network interface 138 may also be coupled to antenna ports of the network interface 106 via RF cabling.

In some embodiments, the detector stations 130 also include components capable of detecting that an RF signal (e.g., an interrogation signal) is being transmitted by a particular antenna element 134. For example, the detector stations 130 may include photodetectors 135 that respectively correspond to the RFID antennas 134 and are positioned in proximate orientations about the circumference of the detector station 130 as the respective RFID antenna 134. As another example, the detector stations 130 may include internal RF sensors 141 configured to produce a voltage level when an RF signal is transmitted by a corresponding RFID antenna 134. As described above, the internal RF sensor 141 may be a splitter positioned in the transmit path that routes the transmit signal to a switching element. In some embodiments, the logic platform 116 may also include a photodetector (not depicted) configured to sense light emitted by an RF sensor in a similar manner to a photodetector 135.

Figure 6:
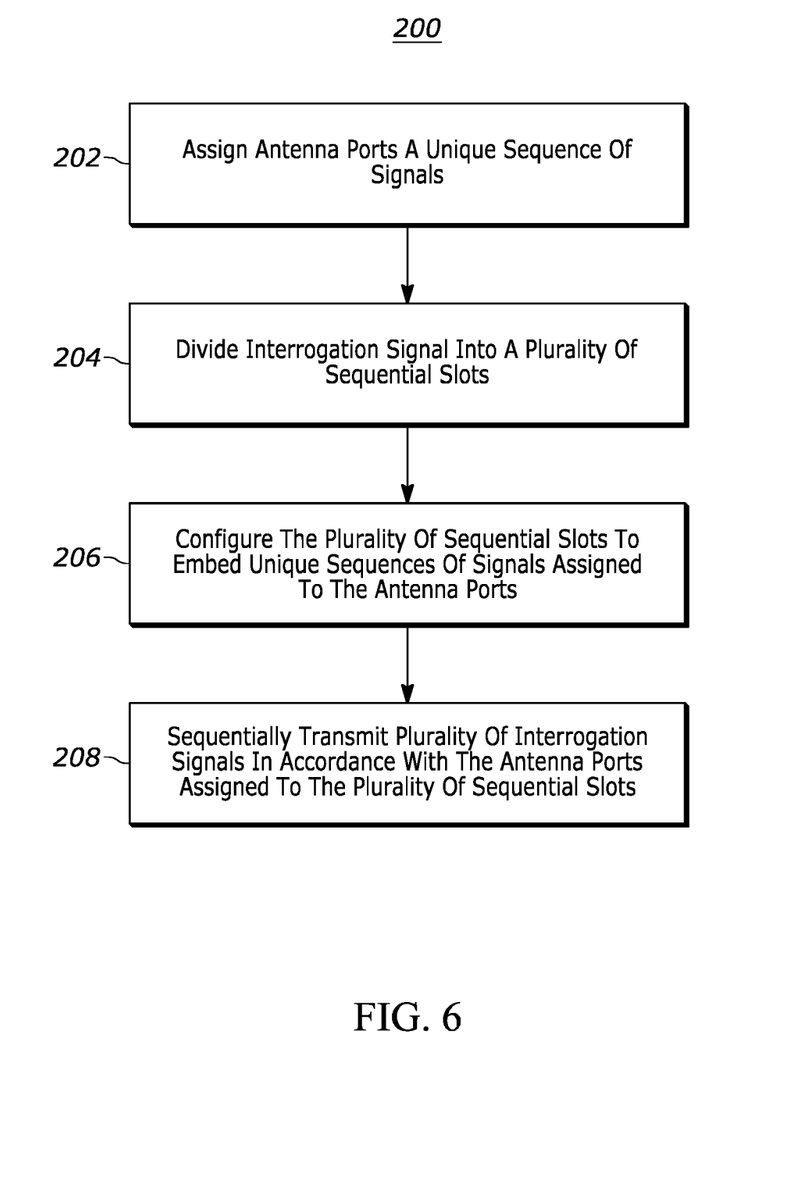
FIG. 6 illustrates a flow diagram of an example method for configuring a controller to perform a calibration interrogation cycle in accordance with techniques described herein.

FIG. 6 illustrates an example flow diagram of an example method 200 that implements the process for calibrating a RFID detector described herein. In an embodiment, the method 200 is implemented by a central controller (e.g., the central controller 16 and/or logic platform 116). As described above, in an embodiment, the central controller includes two or more antenna ports (e.g., the antenna ports 22) configured to be communicatively coupled to two or more antennas (e.g., the antennas 31) via respective RF cables (e.g., the RF cables 24). The central controller also includes a controller (e.g., the controller 102 of FIG. 5) operatively connected to the two or more antenna ports. The controller may be configured to implement a calibration interrogation cycle during which the techniques described with respect to the method 200 are performed.

The method 200 begins at block 202 when the controller assigns each of the two or more antenna ports a unique sequence of on signals and off signals. As described above, the two or more antenna ports may correspond to an identifier and/or port number. Accordingly, the sequence of on signals and off signals may encode the identifier and/or port number.

At block 204, the controller divides the calibration interrogation cycle into a plurality of sequential slots. The number of sequential slots may depend on the number of antenna ports. For example, as illustrated in FIG. 4, in a two antenna port embodiment, the calibration interrogation cycle may include four slots, in a four antenna port embodiment, the calibration interrogation cycle may include ten slots, and in an eight antenna port embodiment, the calibration interrogation cycle may include 36 slots. During a slot of the calibration interrogation cycle, the controller may be configured to transmit an interrogation signal via a particular antenna port assigned to the slot.

At block 206, the controller configures the plurality of sequential slots such that, during each cycle of the calibration interrogation cycle, a sequence of antenna ports assigned to the plurality of slots embeds the unique sequence of on signals and off signals assigned to the two or more antenna ports. To this end, in some embodiments, the on signal for a particular antenna port sequence is an assignment of the particular antenna port to a slot and the off signal for the particular antenna port sequence is a non-assignment of the particular antenna port to a slot.

At block 208, the controller sequentially transmits a plurality of interrogation signals via the two or more antenna ports in accordance with the antenna ports assigned to the plurality of sequential slots to determine whether a sequence of indications provided by an RF sensor corresponds to the unique sequence of on signals and off signals for the two or more antenna ports. In some embodiments, the RF sensor (e.g., the RF sensor 40) is a light-up RFID tag configured to activate a light emitting diode (LED) when the RFID tag is energized via an interrogation signal. In these embodiments, the controller may be operatively connected to a photodetector (e.g., the photodetectors 35, 135) configured to sense light emitted by the LED. In some embodiments, the photodetector is included in a housing that includes at least one of the two or more antennas and/or at the central controller. Additionally or alternatively, the photodetector is an image sensor (e.g., the image sensor 60) having a field of view extending towards an antenna proximate to the RF sensor. In these embodiments, the controller may be configured to (1) analyze image data captured by the image sensor to identify the antenna proximate to the RF sensor; and (2) compare the sequence of indications provided by the RF sensor and detected by the photodetector to the unique sequence of signals assigned to an antenna port to which the antenna proximate to the RF sensor is expected to be coupled.

In some additional embodiments, individual antennas of the two or more antennas are included in respective housings that also include respective RF sensors (e.g., the internal RF sensors 141). In these embodiments, the controller may be operatively connected to the respective RF sensors.

In a first scenario, the controller determines that the RF cable for an antenna under test is communicatively coupled to an intended port of the two or more antenna ports based on the sequence of indications provided by the RF sensor. In a second scenario, the controller determines that the RF cable for an antenna under test is not communicatively coupled to an intended port of the two or more antenna ports based on the sequence of indications provided by the RF sensor.

In the second scenario, the controller may be configured to re-configure a logic circuit disposed between the controller and the one or more antenna ports to couple the antenna under test to the intended port. In some additional or alternative embodiments, the controller may be configured to generate a work order that includes an instruction to re-configure the RF cables connected to at least one of the antenna under test and the antenna port corresponding to the sequence of indications provided by the RF sensor.

Additionally or alternatively, the central controller may also include a memory (e.g., the memory 104) operatively connected to the controller. In these embodiments, the controller may be configured to identify, based on the sequence of indications provided by the RF sensor, a current port of the two or more antenna ports to which the antenna under test is communicatively coupled and store an indication of the current port in the memory. These embodiments may further include an output device operatively connected to the controller such that the controller may configure the output device to present an indication of the current port. For example, the output device may be one of an LED, a display screen, and an audio output.

In some embodiments, the memory is configured to store a mapping between the two or more antenna ports and the two or more antennas. In these embodiments, the controller may be configured to update the stored mappings based on the sequence of indications provided by the RF sensor.

Figure 7:
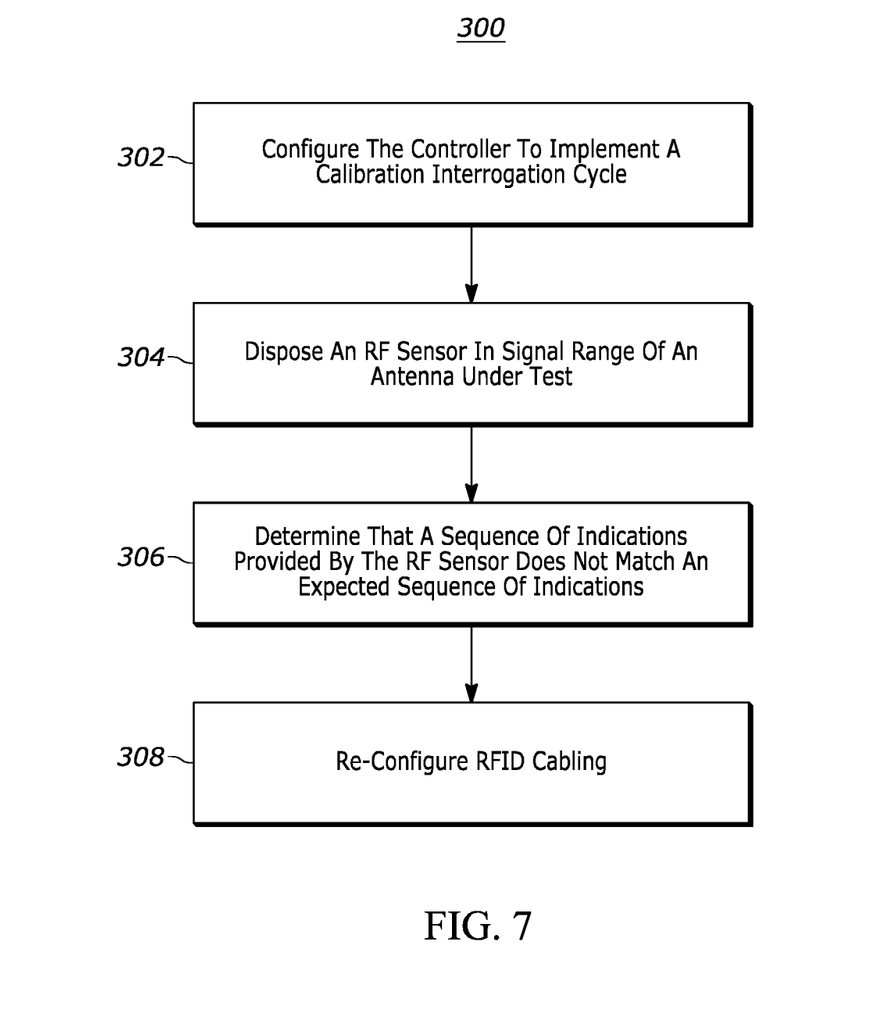
FIG. 7 illustrates a flow diagram of an example method configuring a RFID detector in accordance with techniques described herein.

FIG. 7 illustrates an example flow diagram of an example method 300 for calibrating a RFID detector. In an embodiment, the method 300 is implemented by a central controller (e.g., the central controller 16 and/or logic platform 116) acting in conjunction with a deployment engineer.

The method 300 begins at block 302 when the controller is configured to implement a calibration interrogation cycle in accordance with the method 200.

At block 304, the method includes disposing an RF sensor in a signal range of an antenna under test communicatively coupled to the controller via RF cabling via an antenna port intended to be a first antenna port assigned to the antenna under test. In some embodiments, the RF sensor (e.g., the RFID tag 40) is a light-up RFID tag configured to activate a light emitting diode (LED) when the RFID tag is energized via an interrogation signal.

At block 306, the method includes determining that a sequence of indications provided by the RF sensor does not match an expected sequence of indications for the first antenna port. For example, the method may include determining that the sequence of indications corresponds to a second antenna port. In embodiments where the RF sensor is a light-up RFID tag, determining a sequence of indications provided by the RF sensor may include detecting a sequence of on signals that correspond to when the LED is activated.

In some embodiments, determining that the sequence of indications provided by the RF sensor does not match the expected sequence of indications for the first antenna port includes identifying a port number indicated by an output device of the controller and comparing the port number indicated by the output device to a port number for the first antenna port.

At block 308, the method includes re-configuring the RF cabling based on the sequence of indications provided by the RF sensor. To this end, the RF cabling includes an RF cable coupled to the antenna under test, wherein the RF cable includes a first end coupled to the antenna under test and a second end coupled to the second antenna port. In some embodiments, re-configuring the RF cabling includes un-coupling the first end of the RF cable and coupling the first end of the RF cable to an antenna assigned to the second antenna port. In some other embodiments, re-configuring the RF cabling un-coupling the second end of the RF cable from the second antenna port and coupling the second end of the RF cable to the first antenna port.

In some embodiments, the method may further include disposing an RF sensor in a signal range of a second antenna under test communicatively coupled to the controller via the RF cabling via an antenna port intended to be a second antenna port assigned to the second antenna under test and determining whether a sequence of indications provided by the RF sensor matches an expected sequence of indications for the second antenna port. That is, the method 300 may be performed repeatedly using different antennas (e.g., the antennas 31, RFID antennas 134) as the antenna under test.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A system for calibrating a radio frequency identification (RFID) detector, the system comprising:
   two or more antenna ports configured to be communicatively coupled to two or more antennas via respective RF cables; and
   a controller operatively connected to the two or more antenna ports, wherein the controller is configured to implement a calibration interrogation cycle by:
      assigning each of the two or more antenna ports a unique sequence of on signals and off signals,
      dividing the calibration interrogation cycle into a plurality of sequential slots,
      configuring the plurality of sequential slots such that, during each cycle of the calibration interrogation cycle, a sequence of antenna ports assigned to the plurality of slots embeds the unique sequence of on signals and off signals assigned to the two or more antenna ports, and
      sequentially transmitting a plurality of interrogation signals via the two or more antenna ports in accordance with the antenna ports assigned to the plurality of sequential slots to determine whether a sequence of indications provided by an RF sensor corresponds to the unique sequence of on signals and off signals for the two or more antenna ports.

2. The system of claim 1, wherein during a slot, the controller is configured to transmit an interrogation signal via a particular antenna port assigned to the slot.

3. The system of claim 1, wherein the on signal for a particular antenna port sequence is an assignment of the particular antenna port to a slot and the off signal for the particular antenna port sequence is a non-assignment of the particular antenna port to a slot.

4. The system of claim 1, wherein:
   the RF sensor is a light-up RFID tag configured to activate a light emitting diode (LED) when the RFID tag is energized via an interrogation signal; and
   a photodetector operatively connected to the controller is configured to sense light emitted by the LED.

5. The system of claim 1, further comprising:
   a photodetector operatively connected to the controller, wherein
   the RF sensor is a light-up RFID tag configured to activate a light emitting diode (LED) when the RFID tag is energized via an interrogation signal; and
   the photodetector is configured to sense light emitted by the LED.

6. The system of claim 4, wherein:
   the photodetector is included in a housing that includes at least one of the two or more antennas.

7. The system of claim 4, wherein:
   the photodetector is an image sensor having a field of view that extends toward an antenna proximate to the RF sensor.

8. The system of claim 7, wherein the controller is configured to:
   analyze image data captured by the image sensor to identify the antenna proximate to the RF sensor; and
   compare the sequence of indications provided by the RF sensor and detected by the photodetector to the unique sequence of signals assigned to an antenna port to which the antenna proximate to the RF sensor is expected to be coupled.

9. The system of claim 1, wherein:
   individual antennas of the two or more antennas are included in respective housings;
   the respective housings include respective RF sensors; and
   the controller is operatively connected to the respective RF sensors.

10. The system of claim 1, wherein the controller is configured to:
    determine that the RF cable for an antenna under test is communicatively coupled to an intended port of the two or more antenna ports based on the sequence of indications provided by the RF sensor.

11. The system of claim 1, wherein the controller is configured to:
    determine that the RF cable for an antenna under test is not communicatively coupled to an intended port of the two or more antenna ports based on the sequence of indications provided by the RF sensor.

12. The system of claim 11, further comprising:
    a memory operatively connected to the controller; and
    wherein the controller is configured to:
       identify, based on the sequence of indications provided by the RF sensor, a current port of the two or more antenna ports to which the antenna under test is communicatively coupled; and
       store an indication of the current port in the memory.

13. The system of claim 12, further comprising:
    an output device operatively connected to the controller; and
    wherein the controller is configured to configure the output device to present an indication of the current port.

14. The system of claim 13, wherein the output device is one of an LED, a display screen, and an audio output.

15. The system of claim 11, wherein the controller is configured to:
    re-configure a logic circuit disposed between the controller and the one or more antenna ports to couple the antenna under test to the intended port.

16. The system of claim 11, wherein the system further comprises:

a memory configured to store a mapping between the two or more antenna ports and the two or more antennas; and wherein the controller is configured to:
update the stored mapping based on the sequence of indications provided by the RF sensor.

17. The system of claim 11, wherein the controller is further configured to:
generate a work order that includes an instruction to re-configure the RF cables connected to at least one of the antennas under test and the antenna port corresponding to the sequence of indications provided by the RF sensor.

18. A method of calibrating a radio frequency identification (RFID) detector comprising:
configuring the controller of claim 1 to implement a calibration interrogation cycle;
disposing an RF sensor in a signal range of an antenna under test communicatively coupled to the controller via RF cabling via an antenna port intended to be a first antenna port assigned to the antenna under test;
determining that a sequence of indications provided by the RF sensor does not match an expected sequence of indications for the first antenna port; and
re-configuring the RF cabling based on the sequence of indications provided by the RF sensor.

19. The method of claim 18, wherein determining that a sequence of indications does not match an expected sequence of indications for the first antenna port comprises:
determining that the sequence of indications corresponds to a second antenna port.

20. The method of claim 19, wherein:
the RF cabling includes an RF cable coupled to the antenna under test, wherein the RF cable includes a first end coupled to the antenna under test and a second end coupled to the second antenna port; and
re-configuring the RF cabling comprises:
un-coupling the first end of the RF cable; and
coupling the first end of the RF cable to an antenna assigned to the second antenna port.

21. The method of claim 19, wherein:
the RF cabling includes an RF cable coupled to the antenna under test, wherein the RF cable includes a first end coupled to the antenna under test and a second end coupled to the second antenna port; and
re-configuring the RF cabling comprises:
un-coupling the second end of the RF cable from the second antenna port; and
coupling the second end of the RF cable to the first antenna port.

22. The method of claim 18, wherein:
the RF sensor is a light-up RFID tag configured to activate a light emitting diode (LED) when the RFID tag is energized via an interrogation signal; and
determining a sequence of indications provided by the RF sensor comprises detecting a sequence of on signals that correspond to when the LED is activated.

23. The method of claim 18, wherein determining that the sequence of indications provided by the RF sensor does not match the expected sequence of indications for the first antenna port comprises:
identifying a port number indicated by an output device of the controller; and
comparing the port number indicated by the output device to a port number for the first antenna port.

24. The method of claim 18, further comprising:
disposing an RF sensor in a signal range of a second antenna under test communicatively coupled to the controller via the RF cabling via an antenna port intended to be a second antenna port assigned to the second antenna under test;
determining whether a sequence of indications provided by the RF sensor matches an expected sequence of indications for the second antenna port.

25. A computer-implemented method for calibrating a radio frequency identification (RFID) detector comprising (i) two or more antenna ports configured to be communicatively coupled to two or more antennas via respective RF cables, and (ii) a controller operatively connected to the two or more antenna ports, the method comprising:
assigning, via the controller, each of the two or more antenna ports a unique sequence of on signals and off signals;
dividing, via the controller, an interrogation signal into a plurality of sequential slots;
configuring, via the controller, the plurality of sequential slots such that, during each cycle of the calibration interrogation cycle, a sequence of antenna ports assigned to the plurality of slots embeds the unique sequence of on signals and off signals assigned to the two or more antenna ports; and
sequentially transmitting, via the controller, a plurality of interrogation signals via the two or more antenna ports in accordance with the antenna ports assigned to the plurality of sequential slots to determine whether a sequence of indications provided by an RF sensor corresponds to the unique sequence of on signals and off signals for the antenna port.

26. The computer-implemented method of claim 25, wherein during a slot, the method comprises:
transmitting, via the controller, an interrogation signal via a particular antenna port assigned to the slot.

27. The computer-implemented method of claim 25, wherein the on signal for a particular antenna port sequence is an assignment of the particular antenna port to a slot and the off signal for the particular antenna port sequence is a non-assignment of the particular antenna port to a slot.

* * * * *